United States Patent [19]

Rymal

[11] Patent Number: 4,732,682

[45] Date of Patent: Mar. 22, 1988

[54] AERATION APPARATUS AND METHOD

[75] Inventor: Ted R. Rymal, Conroe, Tex.

[73] Assignee: Poscon, Inc., Conroe, Tex.

[21] Appl. No.: 926,193

[22] Filed: Nov. 3, 1986

[51] Int. Cl.⁴ .......................... B01F 3/04; C02F 3/14; C02F 1/74

[52] U.S. Cl. .................... 210/620; 210/629; 210/758; 210/219; 210/220; 210/242.2; 261/87; 261/93; 261/120; 261/DIG. 75

[58] Field of Search ............... 210/219, 220, 620, 629, 210/758, 242.2; 261/93, 120, DIG. 75, 87

[56] References Cited

U.S. PATENT DOCUMENTS

| | | | |
|---|---|---|---|
| 3,846,516 | 11/1974 | Carlson | 261/120 |
| 4,096,215 | 6/1978 | Albrecht | 261/120 |
| 4,240,990 | 12/1980 | Inhofer et al. | 261/87 |
| 4,280,911 | 7/1981 | Durda et al. | 210/758 |
| 4,297,214 | 10/1981 | Guarnaschelli | 210/219 |
| 4,437,765 | 3/1984 | Seeger | 261/93 |
| 4,448,685 | 5/1984 | Malina | 210/219 |

FOREIGN PATENT DOCUMENTS

| | | | |
|---|---|---|---|
| 2823515 | 12/1979 | Fed. Rep. of Germany | 261/93 |
| 3208025 | 9/1983 | Fed. Rep. of Germany | 210/219 |
| 688308 | 3/1953 | United Kingdom | 261/87 |

Primary Examiner—Benoit Castel
Attorney, Agent, or Firm—Norvell & Associates

[57] ABSTRACT

Improved methods apparatus are provided for introducing and entraining air into a waste liquid, thereby increasing the quantity of dissolved oxygen in the liquid to enhance the aerobic treatment process. A power driven propeller is preferably positioned at the discharge end of conical-shaped transition housing, and draws in air while waste water is controllably introduced to the transition housing from below the surface of the water. The housing upstream from the propeller is primarily an air chamber with incoming streams of water, while the housing downstream from the propeller is filled with waste water having minute entrained air bubbles. The water and entrained air are thus discharged downwardly, and the axis of the equipment preferably inclined to increase circulation in the waste water pond or tank. The techniques of the present invention have relatively low power requirements while substantially increasing gas concentration in the liquid.

18 Claims, 3 Drawing Figures

AERATION APPARATUS AND METHOD

FIELD OF THE INVENTION

Present invention relates to methods and apparatus for efficiently increasing the gas concentration in any liquid and, more particularly, relates to techniques applicable for municipal and industrial applications for effectively raising the oxygen concentration in a body of waste water to enhance aerobic treatment.

BACKGROUND OF THE INVENTION

Various types of aerators and agitators have been designed for use in commercial sewage treatment plants to enhance the breakdown of waste material in water through the aerobic process. Aerobic bacteria in the water require a constant supply of oxygen, and such equipment is designed to continually replenish the water with dissolved oxygen and, preferably, to increase the oxygen concentration to a level which substantially reduces the retention time of the waste water in the pond.

Three principal techniques have been utilized for accomplishing aeration of waste water for municipal or industrial applications. (1) Air diffuser units introduce oxygen near the bottom of a tank through a porous diffuser, such as sintered pipe. Air diffuser units achieve low gas concentration efficiency, and maintenance is high due to plugging problems. (2) Surface aeration units spray waste water in droplet form into the air, thereby increasing the gas concentration of the droplets before falling back onto the pond. Although commonly used, surface aeration units, as shown in U.S. Pat. Nos. 2,271,446 and 4,465,645 do not achieve good tank mixing, are generally expensive to operate and maintain since the units lift the water upward and water falls back onto the unit, and do not achieve the desired high gas concentrations in the waste water. (3) Submerged aeration systems employ a power rotating propeller beneath the surface of the water to push the water downward and achieve mixing while air is released above or below the rotating blades to mix and thereby becoming entrained in the water. These units generally also do not achieve high efficiency, and only small quantities of air per unit time are added to the water. Moreover, much of the air added to the water is retained in bubbles sufficiently large to rise to the surface and escape from the water rather than being entrained for consumption by the aerobic bacteria.

Submerged aeration systems generally fall into one of several classes: U.S. Pat. Nos. 4,240,990, 4,280,911 and 4,306,221 disclose aeration apparatus wherein the propeller is not radially enclosed within a housing, and air propelled by a motor fan is discharged downwardly from the surface to the propeller to mix with the water. U.S. Pat. Nos. 3,788,233, 3,975,469 and 4,448,685 disclose techniques wherein the propeller is similarly not radially enclosed, although air is drawn into the water by the Venturi effect caused by the rotating propeller, and is discharged immediately upstream or axially at the position of the propeller. The apparatii in U.S. Pat. Nos. 4,259,267, 4,437,765 and 4,290,885 also relies upon the Venturi effect to draw air into the water, although the propeller is enclosed within a generally tubular housing.

In an effort to increase the efficiency of submerged aeration systems, some devices employ a hollow propeller blade design, e.g., U.S. Pat. Nos. 2,651,413, 3,846,516, 4,193,949 and 4,265,739. These devices discharge gas through the ends of the blades, and some devices rely upon cavitation to draw air from the surface to the ends of the blades. These devices are, however, more expensive to manufacture, and maintenance is high due to the deleterious affect of cavitation.

The disadvantages of the prior art are overcome by the present invention, and improved methods in apparatus are disclosed below for safety and efficiently dissolving gas, such as oxygen, in a body of liquid to enhance aerobic treatment.

SUMMARY OF THE INVENTION

In a preferred embodiment of the invention, a housing having a central axis consists of a cylindrical-shaped upper portion, a conical-shaped transition portion, and a large diameter cylindrical discharge portion. A powered propeller is positioned at the large diameter end of the transition portion, and an air duct interconnects the transition portion to the surface. The entire housing is submerged below the water with the axis inclined at an angle to increase mixing within the body of water. A polyurethane dome interconnected to the air duct acts as a float for the housing.

Adjustable water inlets in the upper portion regulate the quantity of water entering the housing, and the water intake is substantially restricted compared to prior art units. Once activated, the propeller discharges water from the housing, substantially evacuating the upper and transitional housing portions since water intake is substantially less than the obtainable liquid flow rate of the powered propeller. Since the upper and transitional housing are becoming evacuated, the propeller draws air in from the surface to the intermediate housing, and this air is forcibly mixed with the water by the rotating propeller blades to achieve relatively high gas concentrations in the water. When operating, the upper and transitional housings thus contain large volumes of air and restricted steams of incoming water, while the discharge portion of the housing below the propeller is filled with water having minute particles of entrained air.

By limiting waste water intake and substantially evacuating the housing upstream from the propeller, the dissolved air concentration of the waste water is substantially increased in a single pass through the unit. The air is drawn in by the propeller (rather than the Venturi effect of the moving water), and the air is forced into the water under pressure by the rotating blades (rather than simply being drawn into the water). Moreover, the power requirements per dissolved air concentration are substantially reduced.

The techniques of the present invention thus enable the oxygen concentration in waste water to be substantially increased in less time and utilizing less power than prior art apparatus. Manufacture, installation, and maintenance costs are low, and good mixing of the waste water is achieved. A hydraulically-powered source offers high safety, and may be positioned within the transition housing and sealed from the incoming streams of water.

Although particularly applicable to raising the oxygen concentration of waste water, it should be understood that the methods and apparatus described herein may be effectively used to increase the concentration of any selected gas in a liquid. These and further features and advantage of the present invention will become apparent from the following detailed description, wherein reference is made to the figures in the accompanying drawings.

DETAILED DESCRIPTION OF PREFERRED EMBODIMENTS

Figure 1:
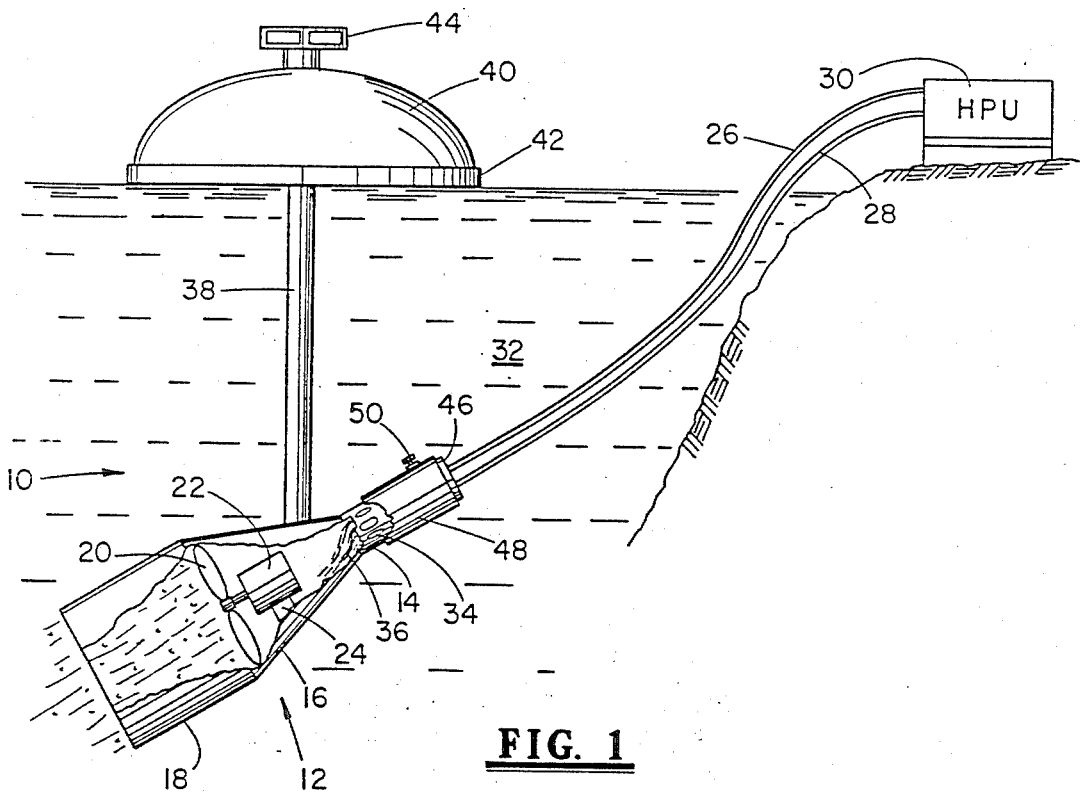
FIG. 1 is a simplified pictorial view of one embodiment of the present invention operating in a waste water pond.

FIG. 1 depicts an aeration unit 10 according to the present invention, including an outer metallic sheet metal housing 12 having an upper cylindrical-shaped portion 14, an intermediate conical-shaped portion 16, and a large diameter cylindrical-shaped discharge portion 18. Propeller 20 is rotationally mounted adjacent the large diameter end of the conical-shaped portion 16, and is driven by hydraulic motor 22 secured to portion 16 by a plurality of circumferentially spaced plates 24. Motor 22 is powered by hydraulic fluid via incoming and return lines 26 and 28 from a conventional on-shore power unit 30.

The entirety of housing 12 is submerged in the the body of waste water 32, and positioned with its central axis inclined at an angle, e.g., between 30° and 60°, to enhance mixing of the waste water in the pond or body of water. The upper end of portion 14 receiving the hydraulic lines is substantially sealed with a rubber grommet 46, and waste water enters the upper portion 14 through a plurality of restricted apertures 36, thereby forming streams 36 of incoming water.

Conical portion 16 is in fluid communication with the surface through substantially vertical duct 38. Duct 38 passes through a dome-shaped float 40 filled with polyurethane, and air enters duct 38 through vent 44. Float 40 is substantially sealed from the water by lower protective pan 42, and serves to position the housing 12 at a selected depth and inclination in the body of waste water. If desired, the position of float 40 in the body of waste water may be substantially fixed by interconnecting the float and a suitable piling with rope or cable (not shown).

Each of the water inlets 34 typically may be approximately 1 inch wide by 2 inches long, and from two and ten inlets may be provided depending on the size of the propeller 20 and motor 22. In any event, the water intake to propeller 20 is somewhat restricted by the limited size and number of apertures 34. Water inflow to propeller 20 is, however, further restricted by an adjustable valve member, such as sleeve 48, which is movably positionable axially with respect to portion 14, and may be selectively locked in place by screw 50. The sleeve 48 may thus be adjusted so that unit 10 operates as described below. When operating, it should be understood that water intake to the propeller 20 is substantially less than the rated liquid flow rate of the propeller 20 powered by motor 22.

Prior to activation, the sleeve 50 will thus be selectively positioned to restrict entry of water to the housing 12 once the motor is activated, although before activation the entirety of housing 12 will be filled with waste water. Once activated, rotation of propeller 20 discharges waste water from the housing at a rate greater than the restricted inflow of water through ports 34, so that in a brief period of time, e.g., between 5 and 20 seconds, a portion of the upper housing 14 and the intermediate housing 16 will become substantially evacuated with water and occupied by air entering the housing through duct 38. The air is thus drawn in directly by rotation of propeller 20, and in its steady state running condition, the interior of housing portions 14 and 16 are substantially air filled with streams 36 of incoming water. Thus the interior of housings 14 and 16 has large pockets of air encompassing streams of incoming water. Generally at least 50 percent, and preferrably in excess of 75 percent, of the interior of housings 14 and 16 is thus air filled when the unit is operating. Since water can only be discharged from the exit housing 18 at a rate equal to water entry through ports 34, the interior of portion 18 remains substantially waterfilled with minutes air bubbles entrained in the water.

It should be noted that the waste water inlet to the housing 12 is substantially below the surface of the water, and generally will be in the range of from three to ten feet below the surface, depending on the size of the tank or pond. The depth of water intake, according to the present invention, has a significant advantage over prior art devices that draw the incoming water either from or substantially adjacent the surface, since the gas concentration of water incoming to the unit decreases with water depth. Thus more oxygen per unit volume of waste water can be added to water drawn from deeper depths, thereby enhancing the aerobic action. Once discharged from the unit, the dissolved oxygen concentration substantially increases, and thus the unit of the present invention substantially increases the gas concentration of the relatively deep waste water compared to prior art units. Preliminary tests suggest that the dissolved oxygen concentration can be raised by drawing in air according to the present invention to levels approaching or even in excess of saturation values for bubbling air into water at one atmosphere. Introducing pure oxygen rather than air suggests that the dissolved oxygen concentration could be raised to values approaching 33 parts per million, which approximates the dissolved oxygen concentration normally obtained at four atmospheres pressure. Moreover, the discharge of the water from the unit is relatively deep in the pond or tank, thus increasing the gas absorption rate and providing good pond mixing.

The hydraulic motor 22 is preferably water sealed, although when operating the motor is generally not totally submerged in water. The hydraulic power source of the present invention has significant safety advantages over electrically powered aeration units. The dissolved oxygen concentration of the waste water is substantially increased in a single pass through the unit, and the power requirements per quantity of dissolved gas added to the waste water is low compared to prior art units. Foaming agents commonly used with surface agitation units and some submerged agitation units are not required. Manufacture, installation, and maintenance costs are relatively low compared to prior art units because of the simplicity of the design. The dome float 40 enables the housing 12 to be easily "swung" to the surface to facilitate repair or adjustment of the unit.

Since the interior within the housing portions 14 and 16 are substantially water evacuated while the unit is running, the rotating propeller 22 creates a slight vacuum within portions 14 and 16 which is continually replenished with incoming air through duct 38. Rather than merely drawing the gas into the water and then relying upon water agitation to break up the gas into sufficiently small bubbles to become absorbed in the water, the propeller blades rotate partially in air, and air is thus forced under high pressure at the water/blade interface into the water. In effect, the action of the present invention of forcing the air into the water is similar to "pounding" the air into water under high pressure. This increased pressure effect is believed to be at least partially responsible for the high dissolved gas concentration values which may be obtained in accordance with the teachings of the present invention.

By utilizing a substantially water-evacuated chamber upstream from the propeller, the present invention substantially increases gas absorption rates. If too much water is incoming to the propeller 20, the quantity of air drawn into duct 38 will substantially decrease, and the sleeve 40 may be lowered to further restrict water intake. If too little water is entering the housing 12 through ports 34, the decreased flow rate of the increased gas concentration waste water will decrease the overall effectiveness of the unit to increase gas concentration of the entire body of water. Thus, a proper balance should be obtained between the incoming water flow rate and the incoming air flow rate to the propeller. In operation, this flow rate is maintained so that at least substantial portions of the cavities in the housing upstream from the fan are water evacuated, as explained above, and the fan at least partially engages air rather than water.

The rotating fan 20 discharges increased gas concentration waste water from housing 18 at substantially the rate of incoming waste water. In other words, the unit volume of waste water is not substantially increased by the minute air bubbles added to the water, which become dissolved in the waste water or otherwise entrained in the waste water before rising to the surface and escaping back to the air. In effect, an inclined "wall" of water is thus maintained adjacent the plane of the rotating propeller, with the wall of water continually trying to rise upstream but being repelled by the rotating propeller, and with the incoming waste water being mixed adjacent the plane of the propeller with the existing waste water, air being forced into the mixture, and water being discharged from the housing 18.

In a typical embodiment of the present invention, cylindrical portion 14 has a four inch diameter, while discharge portion 18 has a substantially increased ten inch diameter. The conical configuration of housing portion 16 substantially increases the effectiveness of the unit and reduces power consumption. Propeller 20 is preferably positioned so that the discharge edge of the propeller is substantially adjacent the large diameter end of portion 16, and thus the center of each blade is slightly upstream, e.g. one-half inch to one inch, from the large diameter end of portion 16. The inclined configuration of the sidewalls adjacent the propeller increases the likelihood that air and water engaged by the blades will travel downstream and be discharged from the unit.

A suitable propeller for the present invention is Model Number PJ19 manufactured by Michigan Wheel Company. A two horsepower hydraulic motor operating at approximately 1200 RPM is sufficient to discharge approximately 1000 gallons per minute of high gas concentration waste water through the unit, which is substantially less than the approximately 1500 gallon per minute capacity of the motor and propeller if water to the propeller were not restricted in accordance with the present invention.

Figure 2:
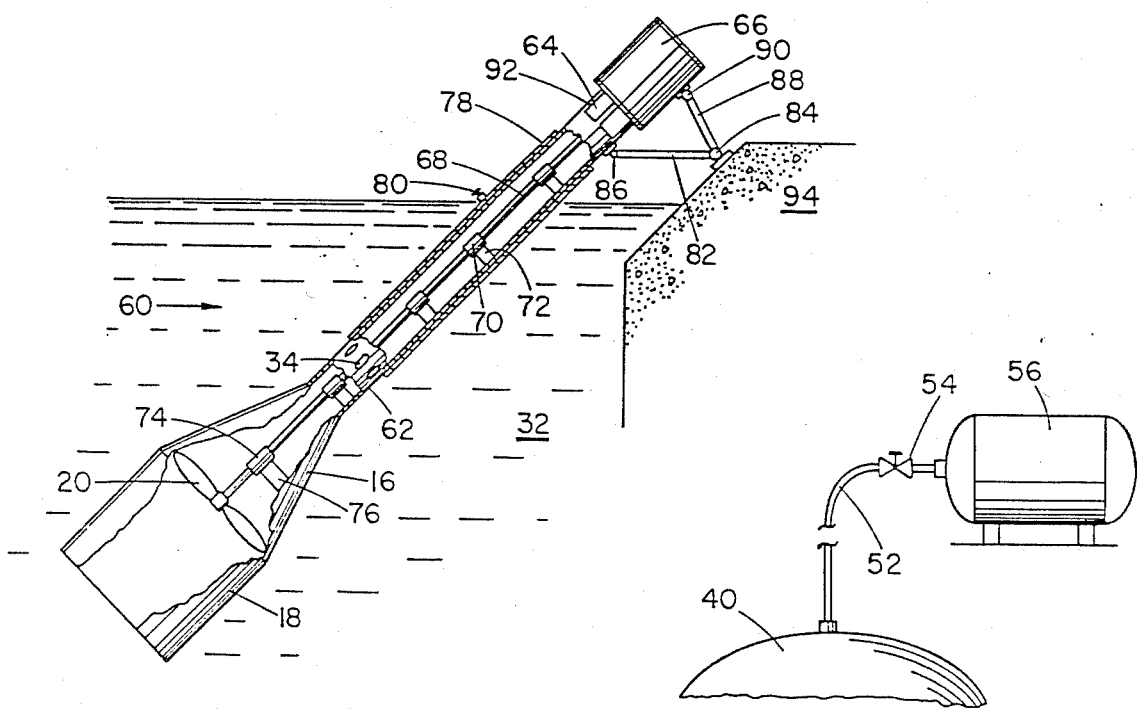
FIG. 2 is an alternate embodiment of the present invention positioned within the waste water holding tank, with the motor positioned above the surface of the water.

FIG. 2 depicts an alternate embodiment of the apparatus shown in FIG. 1, with unit 60 positioned in waste water 32 of a holding tank formed from concrete walls 94. Portion 16, 18, and propeller 20 are provided as described above. The small diameter upper portion 62 has been extended to above the surface of the water, although apertures 34 remain substantially below the water surface for reasons previously described.

The propeller 20 is driven by motor 66 positioned above the water, which may be either hydraulically or electrically powered. Propeller 20 is interconnected to the motor 66 by the elongate shaft 68, and air enters the interior of portion 62 at large openings 64 provided at the end of portion 62. Shaft 68 is rotatably mounted at bearing 74 affixed to portion 16 by a plurality of circumferentially spaced plates 76, and similarly additional bearings 70 circumferentially positioned by plates 72 affixed to portion 62 are provided along the length of the upper portion 62. Elongate sleeve 78 extends above the surface of the water, and a securing member 80 is provided for adjustably fixing the size of the openings 34 to control water intake to the propeller.

The unit as shown in FIG. 2 may be adjustably mounted to the sidewalls of the holding tank by any suitable means. In one embodiment, bracing member 82 is pivotably connected to concrete wall 94 at 84, and also is pivotably connected to upper portion 62 at 86. A second bracing member 88 is pivotably mounted to motor 66 at 90, and also is pivotably connected to wall 94. A plurality of elongate braces 92 structurally interconnect the cylindrical portion 62 and motor 66, so that an appropriately rigid assembly is provided. The unit as shown in FIG. 2 operates in a manner similar that described above. One disadvantage of the assembly shown in FIG. 2 relates to the length of the shaft 68, which must be appropriately secured to prevent excessive wobble of the shaft or the propeller. If desired, the length of shaft 68 and upper portion 62 of the housing could be shortened by raising the depth of intake apertures 34.

Figure 3:
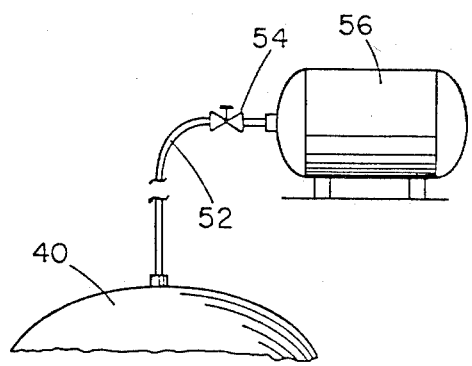
FIG. 3 is an alternate embodiment of portion of the apparatus shown in FIG. 1, with the unit interconnected to a controlled pressurized gas source.

FIG. 3 depicts an alternate embodiment of a portion of the apparatus shown in FIG. 1, and illustrates that any selected gas may be introduced into the housing 12 of the present invention. Line 52 is in fluid communication with duct 38 through the dome float 40, and is connected to a pressurized oxygen tank 56. Since relatively pure oxygen rather than air is being introduced the housing, the aerobic process is enhanced. Valve 54 may be provided for adjusting the level of gas flow to the housing 12, and the gas flow will be restricted so that very few, if any, gas bubbles rise to the surface to the liquid waste water.

The present invention is thus well suited for increasing dissolved oxygen concentration of a body of waste water to enhance aerobic treatment. The concepts of the present invention are, however, applicable to increasing the dissolved gas concentration of various liquids using a selected gas. Thus the teachings of the present invention may be utilized to neutralize the acidity of water by increasing its dissolving carbon dioxide concentration. By further example, the techniques of the present invention may be utilized to add carbination to various liquids, such as soda, or may be used to remove odorous materials dispensed in a liquid.

These and other changes and modifications may be made to the apparatus and methods described herein without departing from the spirit and scope of the present invention. Accordingly, it should be clearly understood that the embodiments described herein and shown in the accompanying drawings are exemplary only and are not intended as limitations from the scope of the invention.

What is claimed and desired to be secured by Letters Patent is:

1. Apparatus for increasing the dissolved oxygen concentration of a body of waste water to enhance aerobic treatment, comprising:
    an outer housing having a restricted waste water inlet, a large opening waste water outlet, and a central axis positionable at an inclined angle in the body of waste water;
    the outer housing including an incoming fluid portion defining an interior cavity expanding radially from a fluid inlet end to a fluid discharge end, and having a discharging fluid portion interconnected with the fluid discharge end of the incoming fluid portion for discharging waste water with increased dissolved oxygen concentration through the waste water outlet;
    a propeller mounted within the incoming fluid portion and rotatable in a plane substantially adjacent the fluid discharge end of the incoming fluid portion;
    adjustable valve means for substantially restricting the flow of waste water through the restricted waste water inlet and to the propeller;
    means for introducing an oxygen-containing gas to the interior cavity of the incoming fluid portion; and
    drive means for rotating the propeller and causing at least a substantial portion of the interior cavity of the incoming fluid portion to become evacuated of waste water and for intermixing the waste water and oxygen-containing gas to substantially increase the dissolved oxygen in the waste water discharged through the waste water outlet.

2. The apparatus of claim 1, wherein the incoming fluid portion has a conical configuration, and the discharging fluid portion has a cylindrical configuration.

3. The apparatus as defined in claim 1, wherein the drive means is mounted within the incoming fluid portion of the outer housing and is hydraulically powered.

4. The apparatus as defined in claim 1, wherein the outer housing futher comprises:
    a cylindrical upper portion secured to the fluid inlet end of the incoming fluid portion and having one or more of the restricted waste water inlets for allowing waste water to flow from the body of water to the propeller.

5. The apparatus as defined in claim 4, wherein the adjustable valve means comprises:
    a sleeve member slidably positionable over the cylindrical upper portion for selectively covering a portion of the one or more waste water inlets to restrict flow of waste water to the propeller.

6. The apparatus as defined in claim 5, wherein the one or more apertures are positioned at least three feet below the surface of the waste water.

7. The apparatus as defined in claim 1, further comprising:
    buoyancy means for maintaining the outer housing at a selected depth in the body of waste water.

8. The apparatus as defined in claim 1, wherein the means for introducing oxygen comprises:
    an air duct interconnecting the incoming fluid portion of the outer housing with air above the waste water.

9. The apparatus as defined in claim 1, further comprising:
    a source of pressurized oxygen-containing gas;
    a gas flow line interconnecting the source of oxygen-containing gas with the incoming fluid portion of the outer housing; and
    gas regulating means for controlling the flow of gas to the incoming fluid portion of the outer housing.

10. Apparatus for increasing the dissolved gas concentration of a body of waste liquid, comprising:
    an outer housing having a restricted liquid inlet below the surface of the waste liquid, a large opening liquid outlet below the liquid inlet, and a central axis positioned at an inclined angle in the body of liquid;
    the outer housing including an incoming fluid portion defining an interior cavity expanding radially from a fluid inlet ends to a fluid discharge end, and having a discharging fluid portion interconnected with the fluid discharge end of the incoming fluid portion for discharging liquid of increased dissolved concentration through the liquid outlet;
    a propeller mounted within the incoming fluid portion and rotatable in a plane substantially adjacent the fluid discharge end of the incoming fluid portion;
    one or more apertures in the outer housing defining the restricted liquid inlet and being of a pre-selected size for substantially restricting the flow of liquid through the restricted liquid inlet and to the propeller;
    means for introducing a selected gas to the interior cavity of the incoming fluid portion; and
    drive means for rotating the propeller and causing at least a substantial portion of the interior cavity of the incoming fluid portion to become evacuated of liquid and for intermixing the liquid and the selected gas to substantially increase the gas concentration of the liquid discharged through the liquid outlet.

11. The apparatus as defined in claim 10, wherein the outer housing further comprises:
    a cylindrically-shaped upper portion secured to the fluid inlet end of the incoming fluid portion.

12. The apparatus as defined in claim 11, further comprising:
    a sleeve member slidably postionable over the cylindrical upper portion for selectively covering a portion of the one or more apertures to restrict flow of liquid to the propeller.

13. A method for increasing the gas concentration in a body of water to enhance aerobic treatment utilizing a power-driven propeller rotating in a submerged housing having a fluid inlet and a fluid outlet, the method comprising:
    providing the housing with an incoming fluid portion expanding radially from a fluid inlet end to a fluid discharge end;
    providing the housing with a discharging fluid portion having substantially a cylindrical configuration;

positioning the housing within the water with the fluid inlet below the surface of the water and the fluid outlet below the fluid inlet;

orienting the housing in the water at an inclined angle;

substantially restricting the flow of water through the fluid inlet and to the propeller;

rotatably mounting the propeller within the incoming fluid portion and adjacent the fluid discharge end of the incoming fluid portion;

rotating the propeller to cause at least a substantial portion of the housing between the fluid inlet and the propeller to become evacuated of water; and introducing a selected gas to the portion of the housing between the fluid inlet and the propeller to fill the evacuated portion of the housing, whereby the propeller rotates partially in the selected gas and forces gas into the water being discharged from the housing.

14. The method as defined in claim 13, wherein the housing is oriented at an angle of from 30° to 60°.

15. The method as defined claim 13, wherein the step of introducing the selected gas comprises:
providing an air duct interconnecting the housing with air above the surface of the water.

16. The method as defined in claim 13, further comprising:
buoyantly supporting the outer housing at a selected depth in the body of water.

17. The method as defined in claim 13, wherein the step of introducing the selected gas comprises:
providing an oxygen-containing compressed gas source; and
regulating the flow of the oxygen-containing gas to the outer housing.

18. The method as defined in claim 13, wherein the propeller is rotated at a speed to evacuate waste water from at least 75% of the interior of the housing between the fluid inlet and the propeller.

* * * * *